(12) United States Patent
Zhou

(10) Patent No.: US 8,834,002 B2
(45) Date of Patent: Sep. 16, 2014

(54) BACKLIGHT MODULE WITH SIDE REFLECTOR PLATE PROTECTION

(71) Applicant: Shenzhen China Star Optoelectronics Technology Co., Ltd., Shenzhen (CN)

(72) Inventor: Gege Zhou, Shenzhen (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 19 days.

(21) Appl. No.: 13/806,771

(22) PCT Filed: Nov. 2, 2012

(86) PCT No.: PCT/CN2012/083943
§ 371 (c)(1),
(2), (4) Date: Dec. 22, 2012

(87) PCT Pub. No.: WO2014/059705
PCT Pub. Date: Apr. 24, 2014

(65) Prior Publication Data
US 2014/0104882 A1  Apr. 17, 2014

(51) Int. Cl.
*F21V 8/00* (2006.01)
(52) U.S. Cl.
CPC ............ *G02B 6/0088* (2013.01); *G02B 6/0031* (2013.01)
USPC .......................................... 362/612; 362/632
(58) Field of Classification Search
CPC .. G02B 6/0073; G02B 6/0088; G02B 6/0031; G02B 6/0043; G02F 1/133603; F21V 21/002; F21V 9/14
USPC .................................................. 362/612, 632
See application file for complete search history.

(56) References Cited

FOREIGN PATENT DOCUMENTS

| CN | 1601338 A | 3/2005 |
|---|---|---|
| CN | 101737735 A | 6/2010 |
| CN | 201562426 U | 8/2010 |
| CN | 102472453 A | 5/2012 |
| CN | 102705761 A | 10/2012 |
| JP | 2011-186024 A | 9/2011 |

OTHER PUBLICATIONS

Gouliang, Leaf,Chinese Patent Application Publication 101737735, Jun. 2010, machine translation.*
Tree, Hawk Yura, Chinese Patent Application Publication 102472453,Mar. 2010 machine translation.*

* cited by examiner

*Primary Examiner* — Tracie Y Green
(74) *Attorney, Agent, or Firm* — Cheng-Ju Chiang

(57) ABSTRACT

The present invention provides a backlight module, which includes a backplane, a light guide plate arranged inside the backplane, a light bar arranged at one side of the light guide plate, a side reflector plate arranged at one side of the light guide plate that is distant from the light bar, and four corner pieces arranged between the backplane and the light guide plate. The corner pieces are made of a rubber material. The corner pieces have surfaces that face the light guide plate and are of a white color. The side reflector plate is arranged between two of the corner pieces. The side reflector plate has a length that is less than or equal to a distance between the two corner pieces so as to achieve a separate arrangement of the side reflector plate and the corner pieces.

11 Claims, 3 Drawing Sheets

BACKLIGHT MODULE WITH SIDE REFLECTOR PLATE PROTECTION

BACKGROUND OF THE INVENTION

1. Field of the Invention

The present invention relates to the field of liquid crystal displaying, and in particular to a backlight module that prevents corner leaking.

2. The Related Arts

Liquid crystal display (LCD) has a variety of advantages, such as thin device body, low power consumption, and being free of radiation, and is thus widely used. Most of the LCDs that are currently available in the market are backlighting LCDs, which comprise a liquid crystal panel and a backlight module. The operation principle of the liquid crystal panel is that liquid crystal molecules are interposed between two parallel pieces of glass and a plurality of vertical and horizontal fine electrical wires is arranged between the two pieces of glass, whereby the liquid crystal molecules are controlled to change direction by application of electricity in order to refract out light emitting from the backlight module for generating images. Since the liquid crystal panel itself does not emit light, light must be provided by the backlight module in order to normally display images. Thus, the backlight module is one of the key components of an LCD. The backlight module can be classified in two types, namely side-edge backlight module and direct backlight module, according to the position where light gets incident. The direct backlight module comprises a light source, such as a cold cathode fluorescent lamp (CCFL) or a light-emitting diode (LED), which is arranged at the back side of the liquid crystal panel to form a planar light source that directly provides lighting to the liquid crystal panel. The side-edge backlight module comprises a backlighting source of an LED light bar arranged at an edge of a backplane that is located rearward of one side of the liquid crystal panel. The LED light bar emits light that enters a light guide plate (LGP) through a light incident face of the light guide plate and is projected out through a light emergence face of the light guide plate, after being reflected and diffused, to thereby form a planar light source for the liquid crystal panel.

As shown in FIGS. 1-2, which is a schematic view showing the structure of a conventional LED backlight module, the backlight module comprises a backplane 100, an LED light bar 300 arranged at one side of the backplane 100, and a light guide plate 500 arranged on the backplane 100. To simplify assembling and lower down cost, the light guide plate 500 is positioned by four rubber blocks 700 arranged at four corners of the backplane 100. The light guide plate 500 is provided, at one side thereof distant from the light bar 300, with a side reflector plate 900 mounted thereto to reflect light into the light guide plate 500 in order to improve utilization rate of light. The side reflector plate 900 is arranged between the light guide plate 500 and the rubber blocks 700. When the light guide plate 500 expands or contracts due to be affected by temperature variation, which causing reciprocal abrasion between the side reflector plate 900 and the rubber blocks 700, separation between the side reflector plate 900 and the light guide plate 500 may easily results at ends thereof, eventually leading to corner leaking in the backlight module.

SUMMARY OF THE INVENTION

An object of the present invention is to provide a backlight module, which has a simple structure and can effectively prevent separation of a side reflector plate attached to a light guide plate from the light guide plate so as to overcome the issue of corner leaking of backlight module.

To achieve the above object, the present invention provides a backlight module, which comprise a backplane, a light guide plate arranged inside the backplane, a light bar arranged at one side of the light guide plate, a side reflector plate arranged at one side of the light guide plate that is distant from the light bar, and four corner pieces arranged between the backplane and the light guide plate. The corner pieces are made of a rubber material. The corner pieces have surfaces that face the light guide plate and are of a white color. The side reflector plate is arranged between two of the corner pieces. The side reflector plate has a length that is less than or equal to a distance between the two corner pieces so as to achieve a separate arrangement of the side reflector plate and the corner pieces.

The corner pieces are made of a white rubber material.

The backplane comprises a bottom board and side boards connected to the bottom board. A corner is formed at connection between every two adjacent ones of the side boards. The corner pieces are respectively set at the corners.

The light bar comprises a linear LED light bar. The light bar is mounted to the side boards of the backplane.

The corner pieces are of an L-shaped configuration.

The present invention also provides a backlight module, which comprises a backplane, a light guide plate arranged inside the backplane, a light bar arranged at one side of the light guide plate, a side reflector plate arranged at one side of the light guide plate that is distant from the light bar, and four corner pieces arranged between the backplane and the light guide plate. Anti-friction blocks are arranged between the side reflector plate and the corner pieces so as to achieve a separate arrangement of the side reflector plate and the corner pieces.

The corner pieces are made of a rubber material.

The backplane comprises a bottom board and side boards connected to the bottom board. A corner being formed at connection between every two adjacent ones of the side boards. The corner pieces are respectively set at the corners.

The anti-friction blocks are smooth plates.

The corner pieces are of an L-shaped configuration.

The present invention also provides a backlight module, which comprises a backplane, a light guide plate arranged inside the backplane, a light bar arranged at one side of the light guide plate, a side reflector plate arranged at one side of the light guide plate that is distant from the light bar, and four corner pieces arranged between the backplane and the light guide plate, the corner pieces being made of a rubber material, the corner pieces having surfaces that face the light guide plate and are of a white color, the side reflector plate being arranged between two of the corner pieces, the side reflector plate having a length that is less than or equal to a distance between the two corner pieces so as to achieve a separate arrangement of the side reflector plate and the corner pieces;

wherein the corner pieces are made of a white rubber material;

wherein the backplane comprises a bottom board and side boards connected to the bottom board, a corner being formed at connection between every two adjacent ones of the side boards, the corner pieces being respectively set at the corners;

wherein the light bar comprises a linear LED light bar, the light bar being mounted to the side boards of the backplane; and wherein the corner pieces are of an L-shaped configuration.

The efficacy of the present invention is that the present invention provides a backlight module, which comprises a side reflector plate that is not set in contact or not in direct contact with corner pieces that are provided for positioning a light guide plate so as to eliminate abrasion between the side reflector plate and the corner pieces found in the known techniques, which may lead to separation between the light guide plate and the side reflector plate, whereby corner leaking occurring in the backlight module caused by separation of the light guide plate and the side reflector plate from each other can be eliminated so as to ensure the luminous intensity and the homogeneity of illumination of the backlight module and improve the quality of the backlight module.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, of the present invention will be apparent from the following detailed description of one or more embodiments of the present invention, with reference to the attached drawings. In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
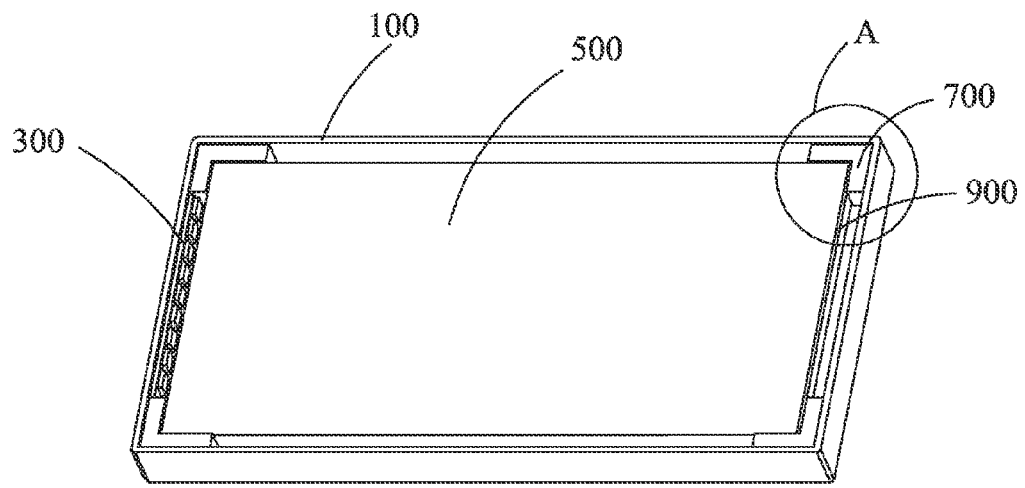
FIG. 1 is a schematic view showing the structure of a conventional LED backlight module.
Figure 2:
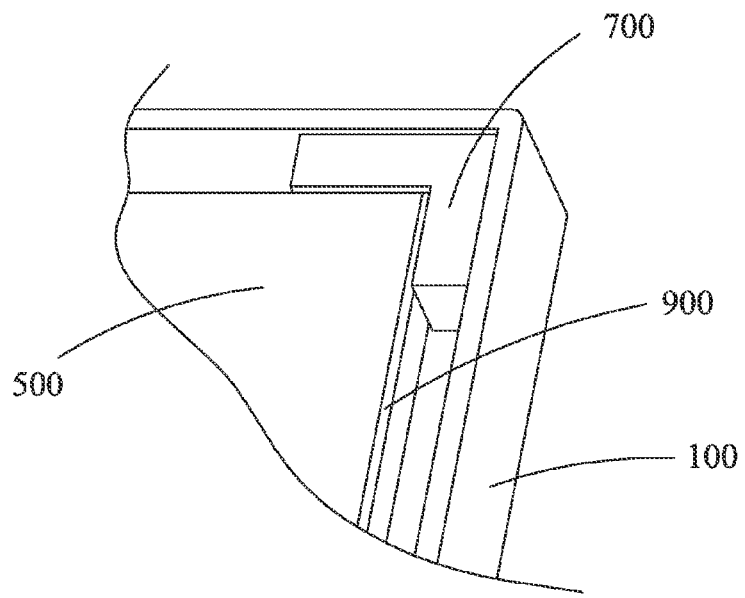
FIG. 2 is an enlarged view of the portion A of FIG. 1.
Figure 3:
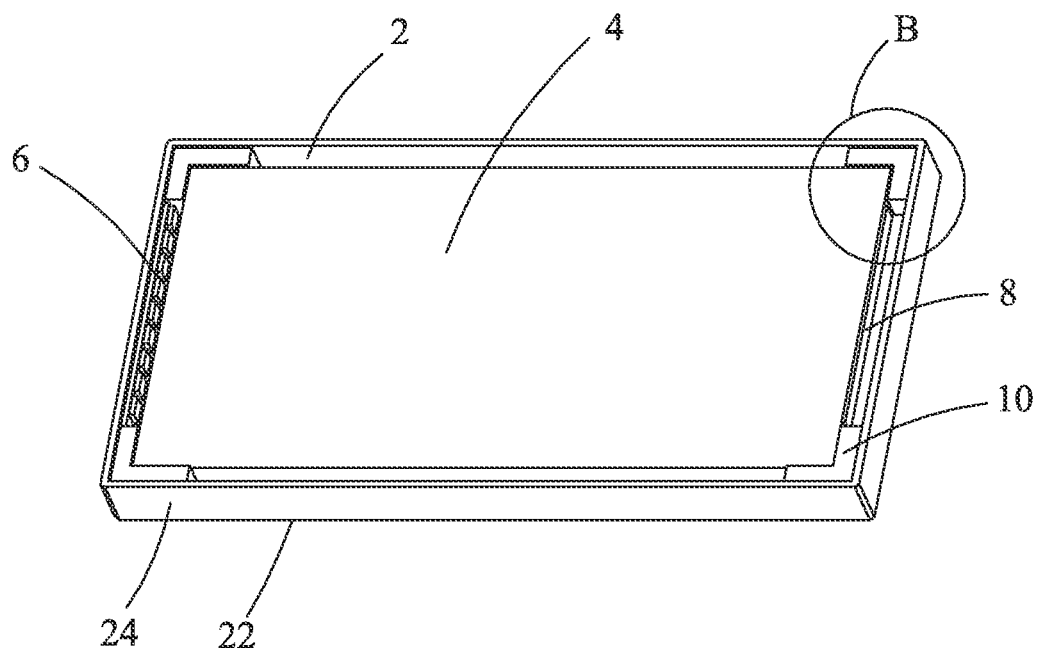
FIG. 3 is a schematic view showing the structure of a backlight module according to an embodiment of the present invention.
Figure 4:
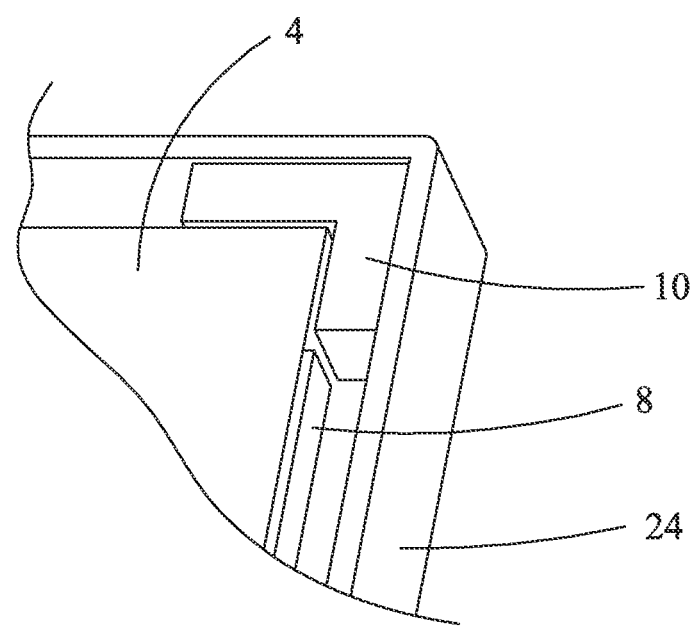
FIG. 4 is an enlarged view of the portion B of FIG. 3.

Referring to FIGS. 3 and 4, the present invention provides a backlight module, which comprises a backplane 2, a light guide plate 4 arranged inside the backplane 2, a light bar 6 arranged at one side of the light guide plate 4, a side reflector plate 8 arranged at one side of the light guide plate 4 that is distant from the light bar 6, and four corner pieces 10 arranged between the backplane 2 and the light guide plate 4. The light bar 6 is a linear LED light bar, which emits light that enters the light guide plate 4 and transmits inside the light guide plate 4 to provide a planar light source of homogeneous illumination.

The backplane 2 comprises a bottom board 22 and side boards 24 connected to the bottom board 22. A corner is formed at connection between every two adjacent ones of the side boards 24. The corner pieces 10 are of an L-shaped configuration and respectively set at the corners. The light bar 6 is mounted to the side boards 24 of the backplane 2. The side reflector plate 8 is mounted at the side opposite to the light bar 6 to reflect light emitting from the light bar 6 in order to ensure the illumination intensity of the backlight module.

The corner pieces 10 are provided for positioning the light guide plate 4. The corner pieces 10 are made of rubber materials and the corner pieces 10 have surfaces that face the light guide plate 4 and are white in color. Preferably, the corner pieces 10 are made of a white rubber material. The side reflector plate 8 is arranged between two of the corner pieces 10 and the side reflector plate 8 has a length that is less than or equal to the distance between the two corner pieces 10. Preferably, the length of the side reflector plate 8 is equal to the distance between the two corner pieces 10, whereby a separate arrangement of the side reflector plate 8 and the corner pieces 10 is achieved to eliminate abrasion caused between the side reflector plate and the corner pieces found in the known techniques, which may lead to separation between the light guide plate and the side reflector plate, whereby corner leaking occurring in the backlight module caused by separation of the light guide plate and the side reflector plate from each other can be eliminated so as to ensure the luminous intensity and the homogeneity of illumination of the backlight module and improve the quality of the backlight module.

Further, since the surfaces of the corner pieces 10 that face the light guide plate 4 are white and are thus of an effect of reflection, whereby the utilization rate of the light emitting from the light bar 6 can be ensured, thus ensuring the illumination intensity of the backlight module.

Figure 5:
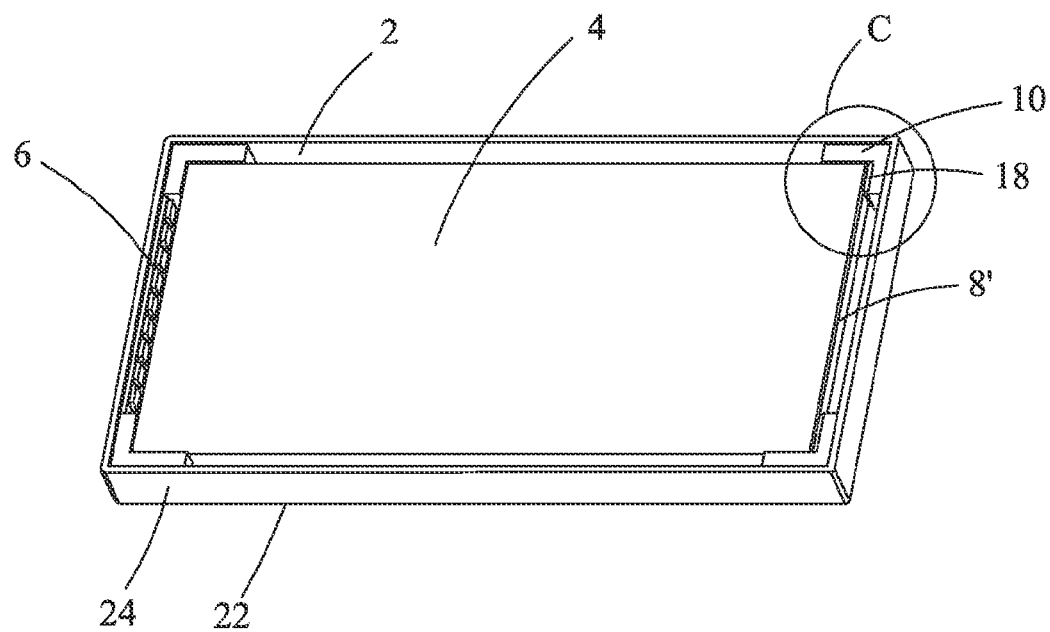
FIG. 5 is a schematic view showing the structure of a backlight module according to another embodiment of the present invention.
Figure 6:
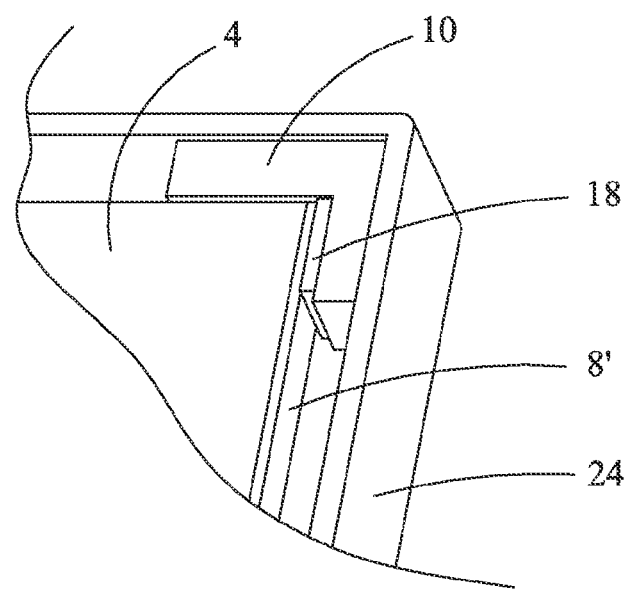
FIG. 6 is an enlarged view of the portion C of FIG. 5.

Referring to FIGS. 5 and 6, the present invention further provides a backlight module, which comprises a backplane 2, a light guide plate 4 arranged inside the backplane 2, a light bar 6 arranged at one side of the light guide plate 4, a side reflector plate 8' arranged at one side of the light guide plate 4 that is distant from the light bar 6, four corner pieces 10 arranged between the backplane 2 and the light guide plate 4, and anti-friction blocks 18 respectively arranged between the side reflector plate 8' and the corner pieces 10. The anti-friction block 18 are plates with high level of smoothness for reducing or eliminating friction between the side reflector plate 8' and the corner pieces 10 to eliminate abrasion caused between the side reflector plate and the corner pieces found in the known techniques, which may lead to separation between the light guide plate and the side reflector plate, whereby corner leaking occurring in the backlight module caused by separation of the light guide plate and the side reflector plate from each other can be eliminated so as to ensure the luminous intensity and the homogeneity of illumination of the backlight module and improve the quality of the backlight module.

The backplane 2 comprises a bottom board 22 and side boards 24 connected to the bottom board 22. A corner is formed at connection between every two adjacent ones of the side boards 24. The corner pieces 10 are made of rubber materials. Preferably, the corner pieces 10 are made of a white rubber material and show an L-shaped configuration and are respectively set at the corners. The light bar 6 is mounted to the side boards 24 of the backplane 2. The side reflector plate 8' is mounted at the side opposite to the light bar 6 to reflect light emitting from the light bar 6 in order to ensure the illumination intensity of the backlight module.

The light bar 6 is a linear LED light bar and the light bar 6 is mounted to the side boards 24 of the backplane 2. The side reflector plate 8' is mounted at the side opposite to the light bar 6 to reflect light emitting from the light bar 6 in order to ensure the illumination intensity of the backlight module.

In summary, the present invention provides a backlight module, which comprises a side reflector plate that is not set in contact or not in direct contact with corner pieces that are provided for positioning a light guide plate so as to eliminate abrasion between the side reflector plate and the corner pieces found in the known techniques, which may lead to separation between the light guide plate and the side reflector plate, whereby corner leaking occurring in the backlight module caused by separation of the light guide plate and the side reflector plate from each other can be eliminated so as to ensure the luminous intensity and the homogeneity of illumination of the backlight module and improve the quality of the backlight module.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A backlight module, comprising a backplane, a light guide plate arranged inside the backplane, a light bar arranged at one side of the light guide plate, a side reflector plate attached to one side of the light guide plate that is distant from the light bar, and four corner pieces arranged between the backplane and the light guide plate, the corner pieces being made of a rubber material, the corner pieces having surfaces that face the light guide plate and are of a white color to provide additional reflectors, the side reflector plate being arranged between two of the corner pieces, the side reflector plate having a length that is less than or equal to a distance between the two corner pieces, wherein the additional reflectors provided by the two corner pieces and the side reflector plate collectively and substantially cover the side of the light guide plate and the side reflector plate is separated from, but close to, the corner pieces so as to protect the side reflector plate from being damaged by abrasion between the side reflector plate and the corner pieces.

2. The backlight module as claimed in claim 1, wherein the corner pieces are made of a white rubber material.

3. The backlight module as claimed in claim 1, wherein the backplane comprises a bottom board and side boards connected to the bottom board, a corner being formed at connection between every two adjacent ones of the side boards, the corner pieces being respectively set at the corners.

4. The backlight module as claimed in claim 3, wherein the light bar comprises a linear light emitting diode (LED) light bar, the light bar being mounted to the side boards of the backplane.

5. The backlight module as claimed in claim 3, wherein the corner pieces are of an L-shaped configuration.

6. A backlight module, comprising a backplane, a light guide plate arranged inside the backplane, a light bar arranged at one side of the light guide plate, a side reflector plate attached to one side of the light guide plate that is distant from the light bar, and four corner pieces arranged between the backplane and the light guide plate, anti-friction blocks being arranged between the side reflector plate and the corner pieces so as to reduce abrasion between the side reflector plate and the corner pieces and thus protecting the side reflector plate from being damaged by the abrasion between the side reflector plate and the corner pieces.

7. The backlight module as claimed in claim 6, wherein the corner pieces are made of a rubber material.

8. The backlight module as claimed in claim 6, wherein the backplane comprises a bottom board and side boards connected to the bottom board, a corner being formed at connection between every two adjacent ones of the side boards, the corner pieces being respectively set at the corners.

9. The backlight module as claimed in claim 8, wherein the anti-friction blocks are smooth plates.

10. The backlight module as claimed in claim 8, wherein the corner pieces are of an L-shaped configuration.

11. A backlight module, comprising a backplane, a light guide plate arranged inside the backplane, a light bar arranged at one side of the light guide plate, a side reflector plate arranged at one side of the light guide plate that is distant from the light bar, and four corner pieces arranged between the backplane and the light guide plate, the corner pieces being made of a rubber material, the corner pieces having surfaces that face the light guide plate and are of a white color to provide additional reflectors, the side reflector plate being arranged between two of the corner pieces, the side reflector plate having a length that is less than or equal to a distance between the two corner pieces, wherein the additional reflectors provided by the two corner pieces and the side reflector plate collectively and substantially cover the side of the light guide plate and the side reflector plate is separated from, but close to, the corner pieces so as to protect the side reflector plate from being damaged by abrasion between the side reflector plate and the corner pieces;

wherein the corner pieces are made of a white rubber material;

wherein the backplane comprises a bottom board and side boards connected to the bottom board, a corner being formed between every two adjacent ones of the side boards, the corner pieces being respectively set at the corners;

wherein the light bar comprises a linear light emitting diode (LED) light bar, the light bar being mounted to the side boards of the backplane; and wherein the corner pieces are of an L-shaped configuration.

* * * * *